US011936423B2

(12) United States Patent
Masuda

(10) Patent No.: US 11,936,423 B2
(45) Date of Patent: Mar. 19, 2024

(54) FAULT DETECTION APPARATUS, FAULT DETECTION METHOD, AND SUBMARINE CABLE SYSTEM

(71) Applicant: NEC Corporation, Tokyo (JP)

(72) Inventor: Akira Masuda, Tokyo (JP)

(73) Assignee: NEC CORPORATION, Tokyo (JP)

( * ) Notice: Subject to any disclaimer, the term of this patent is extended or adjusted under 35 U.S.C. 154(b) by 13 days.

(21) Appl. No.: 17/797,492

(22) PCT Filed: Feb. 5, 2021

(86) PCT No.: PCT/JP2021/004329
§ 371 (c)(1),
(2) Date: Aug. 4, 2022

(87) PCT Pub. No.: WO2021/166686
PCT Pub. Date: Aug. 26, 2021

(65) Prior Publication Data
US 2023/0060104 A1 Feb. 23, 2023

(30) Foreign Application Priority Data

Feb. 19, 2020 (JP) ................................ 2020-025893

(51) Int. Cl.
H04B 10/077 (2013.01)
(52) U.S. Cl.
CPC ................................ H04B 10/0771 (2013.01)
(58) Field of Classification Search
None
See application file for complete search history.

(56) References Cited

U.S. PATENT DOCUMENTS 7,394,951 B2 * 7/2008 Maeda ............... H04B 10/2931
385/5
7,877,023 B2 * 1/2011 Uto ..................... H04B 10/695
398/208
(Continued)

FOREIGN PATENT DOCUMENTS

CN 1674474 A 9/2005
CN 103947136 A 7/2014
(Continued)

OTHER PUBLICATIONS

International Search Report for PCT Application No. PCT/JP2021/004329, dated May 11, 2021.
(Continued)

Primary Examiner — Jai M Lee
(74) Attorney, Agent, or Firm — Sughrue Mion, PLLC

(57) ABSTRACT

A fault detection apparatus includes: a transmitter that transmits a first optical signal through an optical transmission line; a receiver that receives, in response to the transmission of the first optical signal, a second optical signal from the line, and measures the reception level of the second optical signal; and a control unit that specifies a section where the second optical signal corresponding to the first optical signal was generated, calculates an optical level corresponding to a loss in said section on the basis of the reception level, determines that a first fault has occurred in the section when the optical level in the section has changed from a first reference level by a first threshold or more, sets a second reference level and a second threshold after occurrence of the first fault, and determines occurrence of a second fault.

17 Claims, 8 Drawing Sheets

(56) References Cited

U.S. PATENT DOCUMENTS

| | | | | |
|---|---|---|---|---|
| 9,002,197 | B2* | 4/2015 | Dahlfort | H04L 43/0811 |
| | | | | 398/13 |
| 9,276,672 | B2* | 3/2016 | Zhang | H04B 10/0771 |
| 9,673,896 | B2* | 6/2017 | Storey | H04Q 11/0066 |
| 10,084,539 | B2* | 9/2018 | Storey | H04Q 11/0062 |
| 10,931,369 | B2* | 2/2021 | Maccaglia | H04B 10/079 |
| 11,476,930 | B2* | 10/2022 | Matsumoto | H04B 10/071 |
| 2004/0047295 | A1* | 3/2004 | Morreale | H04B 10/0777 |
| | | | | 370/241 |
| 2004/0047629 | A1* | 3/2004 | Evangelides, Jr. | H04B 10/071 |
| | | | | 398/33 |
| 2005/0213968 | A1* | 9/2005 | Uda | H04B 10/00 |
| | | | | 398/30 |
| 2009/0202237 | A1* | 8/2009 | Zhang | H04B 10/298 |
| | | | | 398/6 |
| 2013/0129343 | A1 | 5/2013 | Kram et al. | |
| 2019/0222307 | A1* | 7/2019 | Richardson | H04B 10/035 |

FOREIGN PATENT DOCUMENTS

| | | |
|---|---|---|
| JP | H03-42927 A | 2/1991 |
| JP | 2005-277842 A | 10/2005 |
| JP | 2012-015736 A | 1/2012 |

OTHER PUBLICATIONS

English translation of Written opinion for PCT Application No. PCT/JP2021/004329, dated May 11, 2021.
Extended European Search Report for EP Application No. 21756194.3, dated on Jul. 12, 2023.
Mousaab_et_al, "Investigation of the effect of an increased supervisory signal power in a high-loss loopback monitoring system", IET Communications, The Institution of Engineering and Technology, vol. 8, No. 6, Apr. 1, 2014, pp. 800-804, XP006096086, ISSN: 1751-8628, Birmingham, UK.
CN Office Action for CN Application No. 202180014888.2, dated Dec. 21, 2023 with Engiish Translation.

* cited by examiner

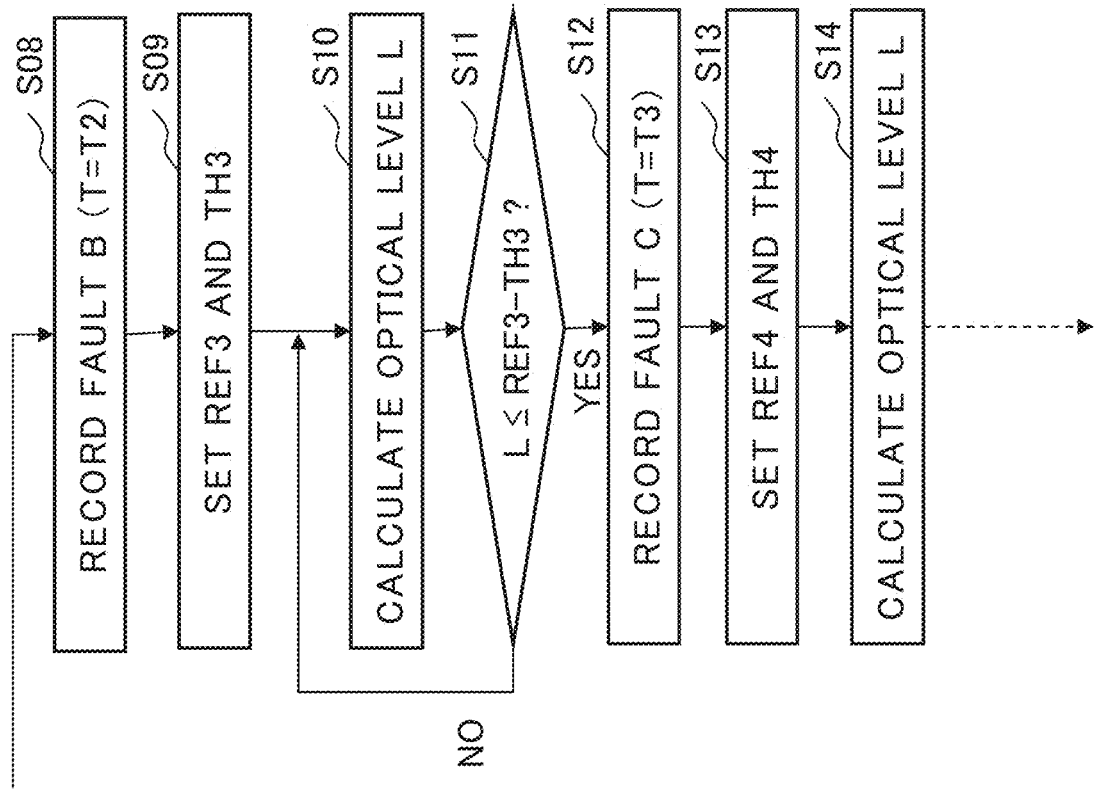
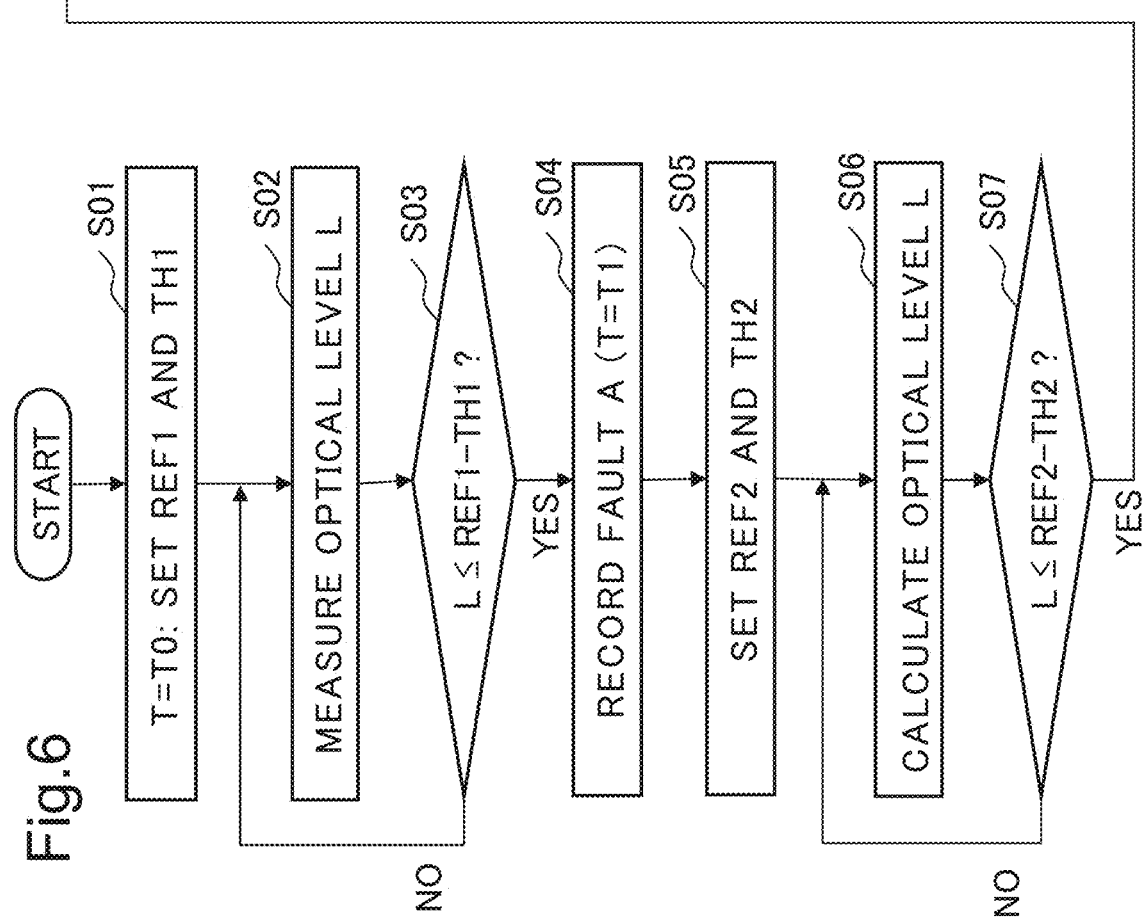
Fig.6

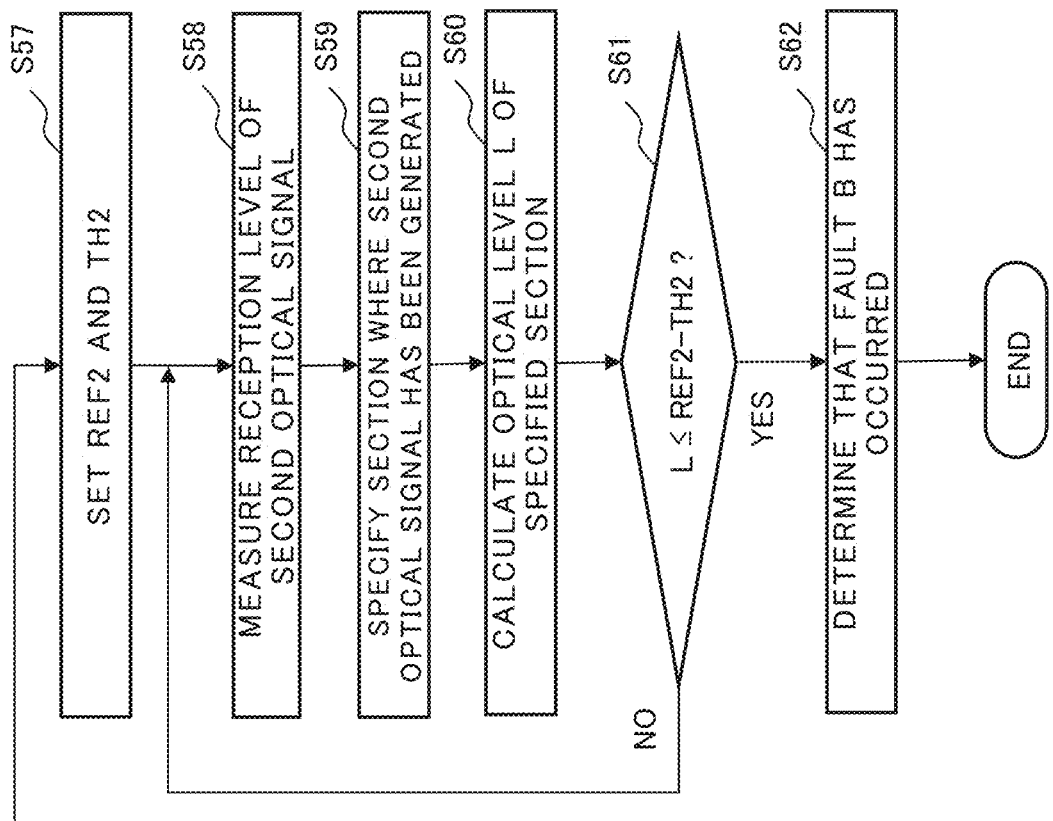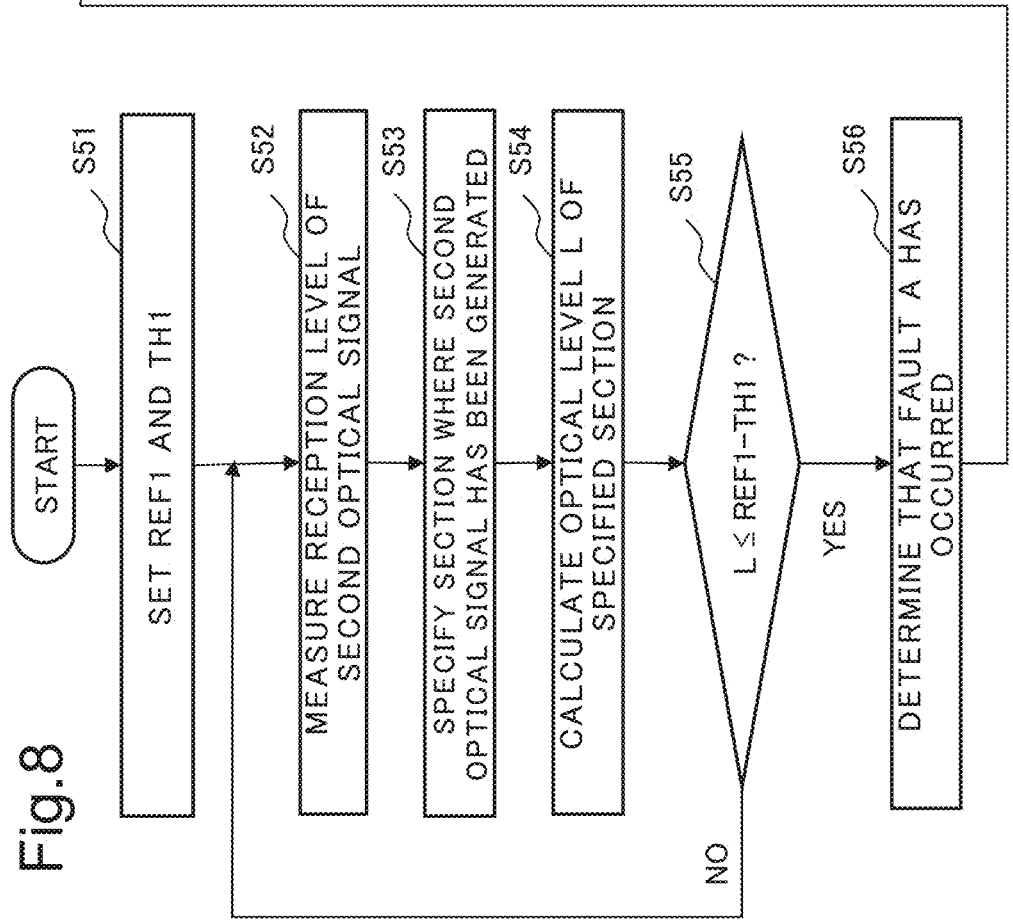
Fig.8

FAULT DETECTION APPARATUS, FAULT DETECTION METHOD, AND SUBMARINE CABLE SYSTEM

This application is a National Stage Entry of PCT/JP2021/004329 filed on Feb. 5, 2021, which claims priority from Japanese Patent Application 2020-025893 filed on Feb. 19, 2020, the contents of all of which are incorporated herein by reference, in their entirety.

TECHNICAL FIELD

The present invention relates to a fault detection apparatus, a fault detection method, and a submarine cable system, and particularly, relates to a fault detection apparatus, a fault detection method, and a submarine cable system that are capable of detecting a fault in a section through which an optical signal is transferred.

BACKGROUND ART

A submarine cable system is an optical communication system that connects between terminal stations installed on land by using an optical cable laid underseas. As one approach to monitor a submarine cable system, a method of monitoring a reception level of an optical feedback of supervisory light transmitted from a terminal station is known. When the reception level of the optical feedback decreases or when there is a large temporal change in the reception level, it can be estimated that there is a fault in an optical cable through which the supervisory light is propagated.

Some repeaters for use in a submarine cable system have a function of turning back supervisory light. A transmitter of a terminal station sends supervisory light to a submarine cable. Repeaters connected to the terminal station loop back the supervisory light, and return the looped-back supervisory light (optical feedback) to the terminal station. A receiver of the terminal station receives the optical feedback. The terminal station repeatedly transmits an optical pulse, and thereby can know a temporal change in a reception level of the optical feedback from each of the repeaters. In connection with the present invention, PTL 1 describes a technique for detecting a fault, based on a level change in an optical signal.

CITATION LIST

Patent Literature

[PTL 1] Japanese Unexamined Patent Application Publication No. 2012-015736

SUMMARY OF INVENTION

Technical Problem

In a general submarine cable system, a reception level of an optical feedback turned back on an optical fiber transmission path by a repeater at a time of system installation is set as an initial value. Then, when the reception level of the optical feedback decreases from the initial value by a predetermined threshold value or more, it is determined that a fault has occurred. In this case, there is a problem that, even when the reception level of the optical feedback decreases by the threshold value or more upon occurrence of a first fault and thereafter the reception level of the optical feedback further decreases in a same section due to a second fault, the second fault cannot be detected as another fault because an alarm has been already issued for the first fault.

OBJECT OF INVENTION

An object of the present invention is to provide a technique for detecting each of a plurality of faults occurring in a section through which an optical signal is transferred.

Solution to Problem

A fault detection apparatus according to the present invention includes:
a transmission means for transmitting a first optical signal to an optical transmission path;
a reception means for receiving a second optical signal from the optical transmission path in response to transmission of the first optical signal, and measuring a reception level of the second optical signal; and
a control means for specifying a section where the second optical signal according to the first optical signal has been generated, calculating, based on the reception level, an optical level associated with a loss in the section, determining that a first fault has occurred in the section when the optical level of the section has changed from a first reference level by a first threshold value or more, setting a second reference level and a second threshold value after occurrence of the first fault, and determining that a second fault has occurred in the section when the optical level has changed from the second reference level by the second threshold value or more.

A fault detection method according to the present invention includes procedures of:
transmitting a first optical signal to an optical transmission path;
receiving a second optical signal from the optical transmission path in response to transmission of the first optical signal;
measuring a reception level of the second optical signal;
specifying a section where the second optical signal according to the first optical signal has been generated;
calculating, based on the reception level, an optical level associated with a loss in the section;
determining that a first fault has occurred in the section when the optical level of the section has changed from a first reference level by a first threshold value or more;
setting a second reference level and a second threshold value after occurrence of the first fault; and
determining that a second fault has occurred in the section when the optical level has changed from the second reference level by the second threshold value or more.

Advantageous Effects of Invention

The present invention enables detecting each of a plurality of faults occurring in a section through which an optical signal is transferred.

BRIEF DESCRIPTION OF DRAWINGS

FIG. 6 is a flowchart illustrating an example of a procedure of detecting a fault.

FIG. 8 is a flowchart illustrating an example of a procedure of detecting a fault according to the second example embodiment.

EXAMPLE EMBODIMENT

First Example Embodiment

Figure 1:
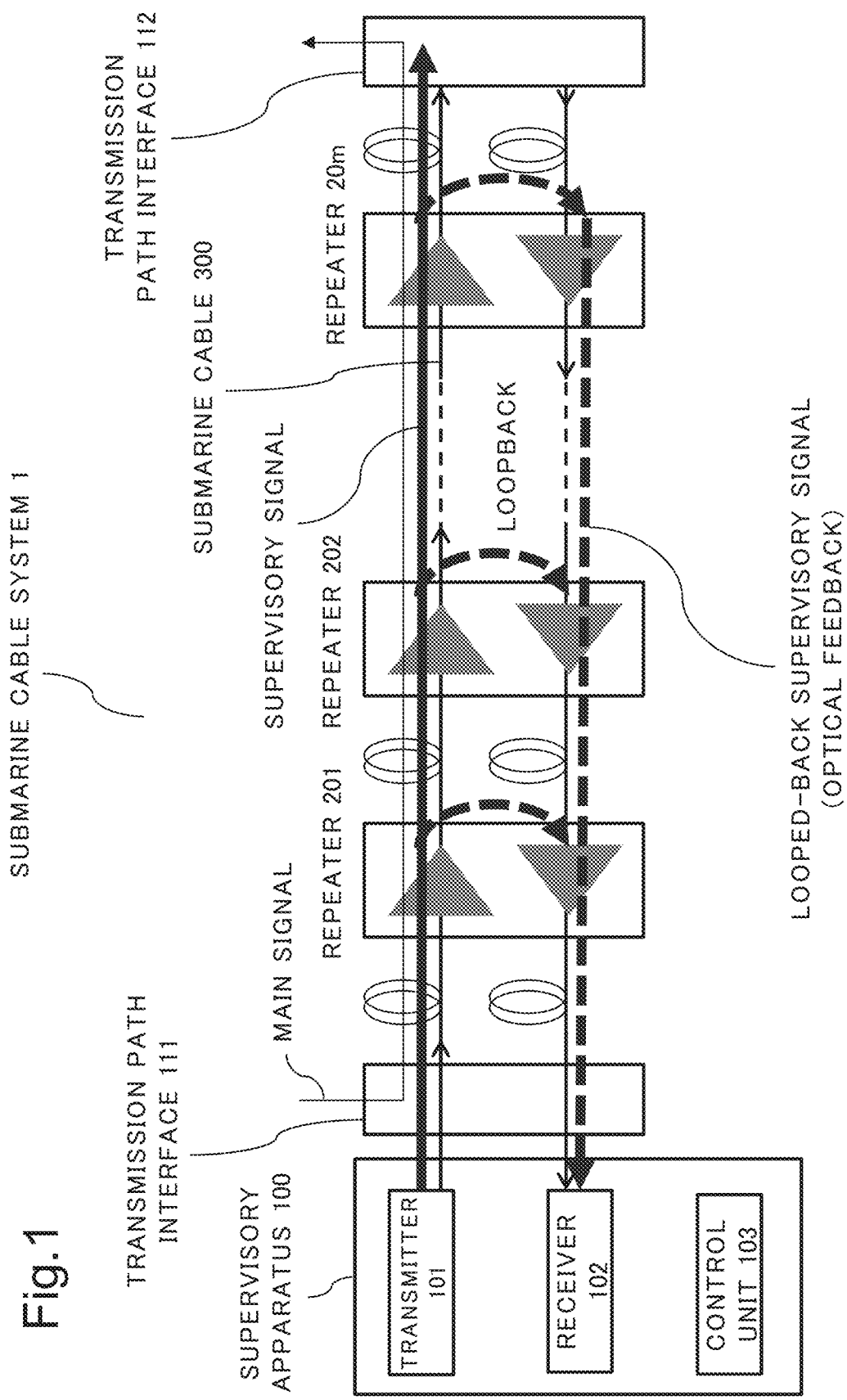
FIG. 1 is a block diagram illustrating a configuration example of a submarine cable system 1 according to a first example embodiment.

FIG. 1 is a block diagram illustrating a configuration example of a submarine cable system 1 according to a first example embodiment of the present invention. The submarine cable system 1 includes a supervisory apparatus 100, transmission path interfaces 111 and 112, and m repeaters 201 to 20m. A letter m is a natural number. The repeaters 201 to 20m have an identical configuration. Hereinafter, the repeaters 201 to 20m will be written as a repeater 200 when collectively called. The repeater 200 is installed underseas. The transmission path interfaces 111 and 112 and the repeater 200 are connected in cascade by a submarine cable 300. The submarine cable 300 is a cable including an optical fiber and a feed line. The repeater 200 operates by receiving power fed from an unillustrated terrestrial power source apparatus via the submarine cable 300.

The supervisory apparatus 100 includes a transmitter 101, a receiver 102, and a control unit 103. The transmitter 101 transmits a supervisory signal. The receiver 102 receives the supervisory signal looped-back in the repeater 200, and outputs, to the control unit 103, an electrical signal according to a reception level of the supervisory signal. The control unit 103 controls the supervisory apparatus 100. The supervisory signal is an optical signal for monitoring the submarine cable system 1.

The transmission path interfaces 111 and 112 are interfaces connecting between the submarine cable 300 and equipment installed on land such as the supervisory apparatus 100. The transmission path interface 111 multiplexes a supervisory signal transmitted by the transmitter 101 and an optical signal (main signal) including user data, and sends the multiplexed signal to the submarine cable 300. Furthermore, the transmission path interface 111 separates an optical signal received from the submarine cable 300 into a supervisory signal and a main signal. A supervisory signal looped-back in each repeater 200 is separated from a main signal by the transmission path interface 111, and is received by the receiver 102. In order to connect between the submarine cable 300 connected to the repeater 20m and equipment on land, the transmission path interface 112 including a function similar to the transmission path interface 111 may be installed.

A main signal is, for example, a wavelength-multiplexed signal being transferred between an optical transmission apparatus 121 and an optical transmission apparatus 122. The optical transmission apparatuses 121 and 122 are optical transmission/reception apparatuses connected to the transmission path interfaces 111 and 112, respectively. The transmission path interface 111 may be included in the supervisory apparatus 100. Alternatively, the transmission path interfaces 111 and 112 may be included in the optical transmission apparatuses 121 and 122, respectively. The transmission path interfaces 111 and 112 have a multiplexing/demultiplexing function of performing wavelength-multiplexing and wavelength-separation of a supervisory signal and a main signal.

A supervisory signal is an optical pulse having a prescribed peak level and a duration. A wavelength of a supervisory signal is set to a wavelength not overlapping a wavelength of a main signal. A wavelength of a supervisory signal is preferably within a wavelength band with which the repeater 200 can relay. A wavelength outside a band of a main signal may be set as a wavelength of a supervisory signal. Alternatively, a wavelength of an unused main signal may be used for a wavelength of a supervisory signal.

The transmitter 101 includes, for example, a light source and a pulse modulator for the light source. The transmitter 101 repeatedly outputs a supervisory signal to the submarine cable 300 via the transmission path interface 111. The receiver 102 is a photoelectric converter, and includes, for example, a photodiode. The receiver 102 receives a supervisory signal (optical feedback) looped-back from each repeater, and outputs an electrical signal according to a reception level of the supervisory signal to the control unit 103. The control unit 103 measures, based on the electrical signal, a reception level of a supervisory signal, and records, in a storage unit such as a non-volatile semiconductor memory, the reception level in association with a repeater in which the supervisory signal is looped-back and a measurement time. The storage unit is included in, for example, the control unit 103.

Figure 2:
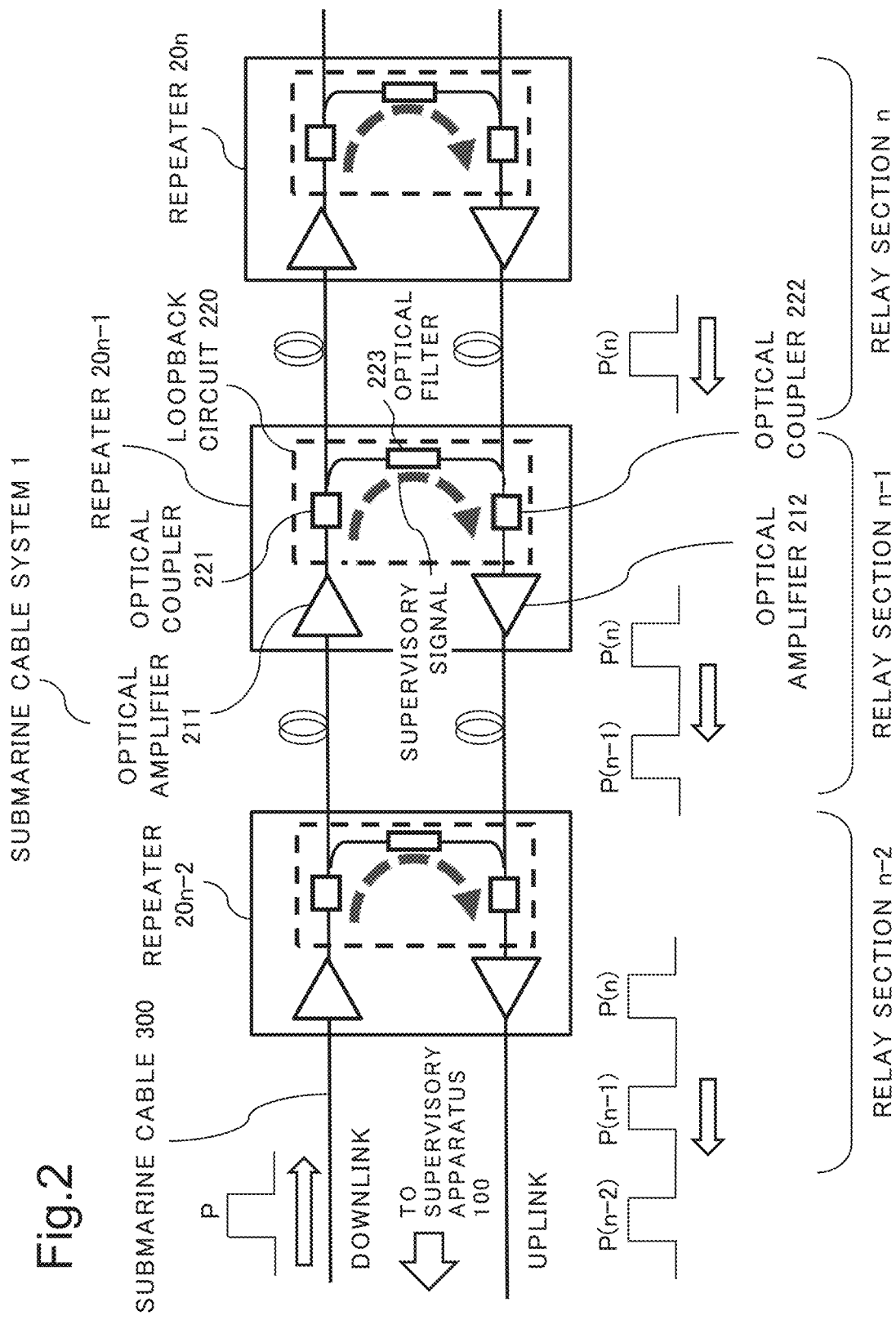
FIG. 2 is a diagram illustrating loopback of a supervisory signal.

FIG. 2 is a diagram illustrating loopback of a supervisory signal. In FIG. 2, three repeaters 20n-2, 20n-1, and 20n having an identical configuration are exemplified. A letter n is an integer equal to or more than 3 but equal to or less than m. A section including the submarine cable 300 and the repeater 20n between the repeater 20n-1 and the repeater 20n will be hereinafter written as a relay section n. A section including the submarine cable 300 between the repeater 202 and the repeater 201 can be called a relay section 2. A section including the submarine cable 300 between the repeater 201 and the transmission path interface 111 can be called a relay section 1. The repeater 200 includes optical amplifiers 211 and 212 amplifying an input optical signal, and a loopback circuit 220.

The loopback circuit 220 turns back a supervisory signal transmitted to a downlink direction (a direction from left to right in FIG. 2) by the supervisory apparatus 100 to an uplink direction (a direction from right to left in FIG. 2). The loopback circuit 220 is configured, for example, in such a way as to connect between one set of fiber pairs (FPs) included in the submarine cable 300 by using two 1×2 optical couplers 221 and 222. An optical filter 223 is arranged between the optical coupler 221 and the optical coupler 222. The optical filter 223 transmits light having a wavelength of a supervisory signal, and blocks light having a wavelength of a main signal. For the optical filter 223, an optical fiber grating or a dielectric multilayer film filter may be used. With such a configuration, a supervisory signal propagating through the downlink submarine cable is looped-back in the loopback circuit 220 of each repeater. The looped-back supervisory signal propagates through the uplink submarine cable and returns to the supervisory apparatus 100. Note that, the configuration in FIG. 2 in which a supervisory signal is looped-back by the repeater 200 is an example, and does not limit a configuration of the loopback circuit 220.

The supervisory apparatus 100 sends a supervisory signal repeatedly to the submarine cable 300. FIG. 2 illustrates an example of propagation of one supervisory signal P input to the submarine cable 300. The optical amplifier 211 amplifies an optical signal acquired by wavelength-multiplexing a supervisory signal and a main signal. The optical amplifier 211 compensates for a decreased level in each relay section of a main signal and a supervisory signal being transferred in the downlink direction. The loopback circuit 220 of each repeater loops back the supervisory signal P propagating in the downlink direction, and sends the supervisory signal P to the uplink direction. A time at which the supervisory signal P is looped-back is earlier in a repeater closer to the supervisory apparatus 100. Thus, the looped-back supervisory signal is received by the receiver 102 in order of supervisory signals P(n−2), P(n−1), and P(n). The receiver 102 measures a reception level of the received supervisory signal. Herein, a propagated distance of the received supervisory signal can be calculated from a difference between a transmission time and a reception time of the supervisory signal and a propagation velocity of the supervisory signal. A distance from the supervisory apparatus 100 to the repeater 200 in which the supervisory signal is looped-back can be considered as half the propagated distance. Accordingly, the control unit 103 can specify a repeater in which the received supervisory signal is looped-back.

The control unit 103 records a reception level of a supervisory signal in association with a repeater in which the supervisory signal is looped-back and a measurement time. Note that, a width of an optical pulse of a supervisory signal to be transmitted and a transmission interval are preferably set in such a way that supervisory signals looped-back in adjacent repeaters are not redundantly received by the receiver 102.

From a change in reception levels of supervisory signals looped-back in adjacent two repeaters, a change in a loss in a relay section between the repeaters can be known. For example, it is assumed that the supervisory signal P(n−1) looped-back in the repeater 20n-1 has an optical power of S(n−1) at an input of the repeater 20n-2, and the supervisory signal P(n) looped-back in the repeater 20n has an optical power of S(n) at the repeater 20n-1. A profile of a spectrum of an optical signal being transferred is preserved between an input and an output of each repeater. Thus, a change in a difference between a reception level of the supervisory signal P(n−1) and a reception level of the supervisory signal P(n) at the receiver 102 is relevant to a change in an optical power difference (level difference) S(n−1)-S(n) between both ends of the relay section n. Accordingly, first, the supervisory apparatus 100 outputs the supervisory signal P repeatedly to the submarine cable 300. Then, the control unit 103 calculates and records a temporal change in a difference between reception levels of the adjacent supervisory signals P(n−1) and P(n). In this way, a change in a loss in the relay section n can be monitored.

The submarine cable system 1 may be designed in such a way that supervisory signals looped-back in repeaters have an identical level at outputs of the repeaters in the uplink direction when there is no fault occurring in the submarine cable system 1. In such a case, a level difference S(n−1)-S(n) indicates a loss in the relay section n. Further, in such a case, a difference between a reception level of the supervisory signal P(n−1) and a reception level of the supervisory signal P(n) at the receiver 102 indicates a loss in the relay section n.

As described above, a loss change in the relay section n can be associated with a change in a difference between reception levels of the supervisory signal P(n−1) and the supervisory signal P(n). Thus, an initial value is set for a difference between a reception level of the supervisory signal P(n−1) and a reception level of the supervisory signal P(n), and a subsequent change in a reception level of a looped-back supervisory signal can be recorded in association with a loss change in each relay section. Hereinafter, a difference between reception levels associated with a loss in the relay section n of the supervisory apparatus 100 will be written as an "optical level of the relay section n". When a loss in only the relay section n increases, only the level difference S(n−1)-S(n) decreases, and thus, the optical level of the relay section n decreases. In other words, a decrease in the optical level of the relay section n is relevant to a loss increase relative to the initial value in the relay section n.

The control unit 103 determines that a fault has occurred in the relay section n when the optical level of the relay section n has decreased from the initial value by a predetermined threshold value or more. When a fault is detected (that is, occurrence of a fault is determined), the control unit 103 sets and records a new reference level and a new threshold value to be a reference for subsequent fault detection in the relay section n. A procedure therefor will be described below.

Figure 3:
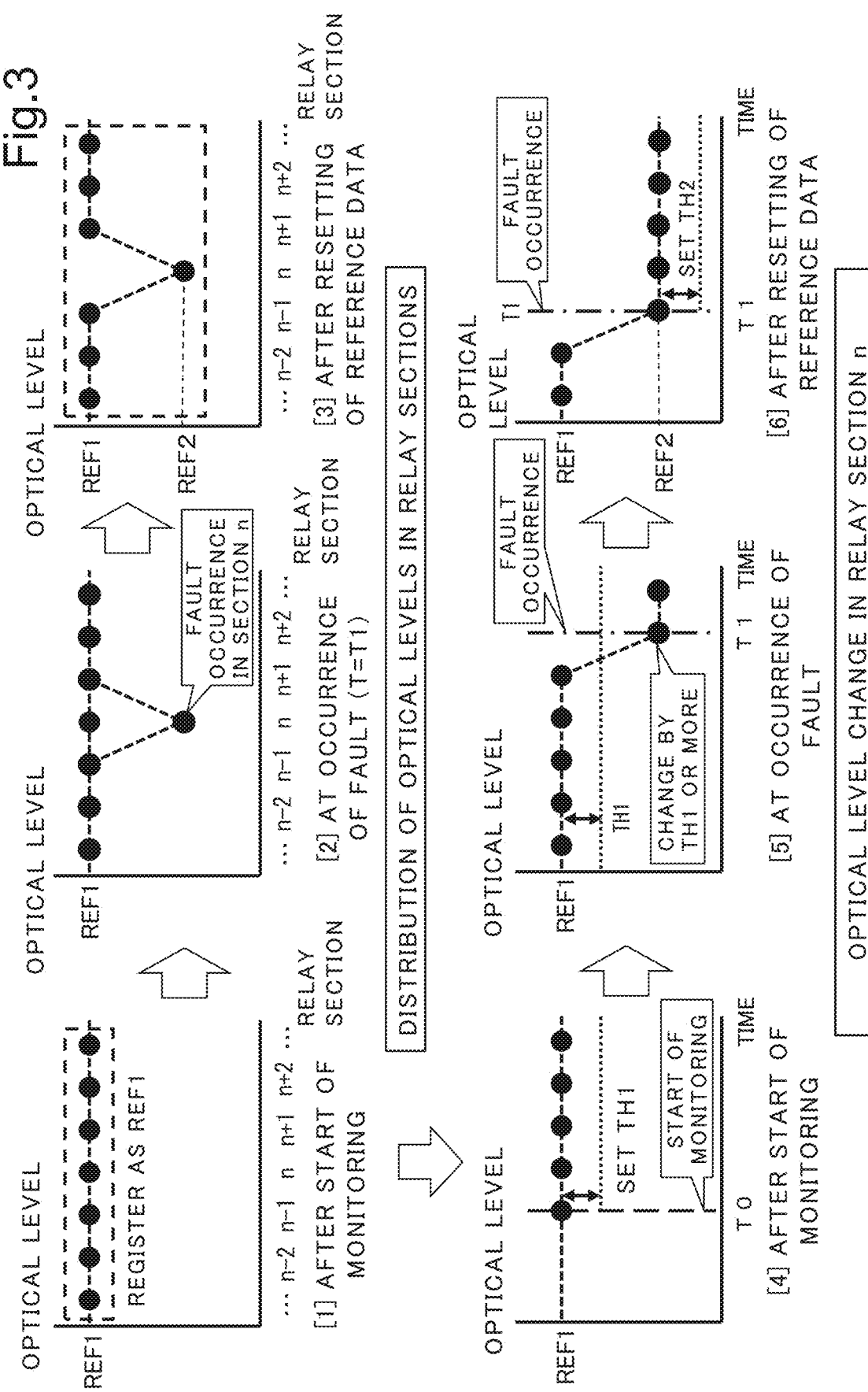
FIG. 3 is a diagram illustrating an example of detection and recording of a fault in a relay section.

FIG. 3 is a diagram illustrating an example of detection of a fault in a relay section of the supervisory apparatus 100. The transmitter 101 repeatedly transmits an optical pulse to the submarine cable 300. The receiver 102 receives a supervisory signal looped-back in each of the repeaters 201 to 20m. The control unit 103 measures a reception level of the received supervisory signal, and records an optical level by each relay section, based on a measurement result of the reception level. Thereby, the control unit 103 calculates a temporal change in the optical level of the relay section n.

[1] to [3] in FIG. 3 are examples of a distribution of losses by each relay section at different times after start of monitoring. A horizontal axis in [1] to [3] in FIG. 3 is a relay section, and a vertical axis is an optical level of a supervisory signal in an associated relay section. [4] to [6] in FIG. 3 are examples of a change in the optical level of the relay section n. A horizontal axis in [4] to [6] in FIG. 3 is a time, and a vertical axis is the optical level of the relay section n. The transmitter 101 transmits an optical pulse at fixed time intervals, and, thereby the control unit 103 can monitor a change in the optical level regularly and autonomously.

[1] in FIG. 3 indicates the optical level when no fault has occurred after start of monitoring. In [1] in FIG. 3, an initial value of the optical level of each relay section at start of monitoring is normalized as a reference level REF1. A change in the optical level after start of monitoring is relevant to a loss change relative to the initial value. Since there is no relay section where a fault has occurred in [1] in FIG. 3, the optical levels of the relay sections are substantially equal.

[4] in FIG. 3 indicates a temporal change in the optical level of the relay section n in a situation of [1] in FIG. 3. When no fault has occurred in the relay section n, the optical level of the relay section n is fixed even with a lapse of time. The control unit 103 of the supervisory apparatus 100 determines that a fault has occurred when the optical level becomes equal to or less than a level (REF1−TH1) indicated by a first threshold value TH1.

[2] in FIG. 3 is an example of the optical level at a time T1 of occurrence of a fault. When a fault A has occurred in the relay section n, a reception level at the receiver 102 of a supervisory signal looped-back in the repeater n−1 and a repeater closer to the supervisory apparatus 100 than the repeater n−1 does not change. On the other hand, a reception level at the receiver 102 of a supervisory signal looped-back in the repeater n and a repeater farther from the supervisory apparatus 100 than the repeater n decreases. Accordingly, the optical level of the relay section n decreases below REF1. The optical level other than the relay section n is not influenced by a loss change in the relay section n.

[5] in FIG. 3 indicates an example of a temporal change in the optical level of the relay section n before and after the time T1. [5] in FIG. 3 indicates an example in which the optical level of the relay section n changes by the first threshold value TH1 or more at the time T1 of occurrence of the fault A and keeps at a substantially fixed value after a decrease in the optical level.

[3] and [6] in FIG. 3 are diagrams illustrating resetting of a reference level and a threshold value after occurrence of the fault A in the relay section n. The control unit 103 sets and records, as a second reference level REF2, the optical level of the relay section n that has decreased due to occurrence of the fault A. Furthermore, the control unit 103 sets and records a second threshold value TH2 associated with the second reference level REF2. The control unit 103 may autonomously perform such resetting of the reference level and the threshold value. Note that, the optical level of a relay section n+1 and a relay section farther from the supervisory apparatus 100 than the relay section n+1 does not change, and thus, the reference level and the threshold value remain as REF1 and TH1, respectively.

The first reference level REF1 may be the normalized optical level immediately after start of operation of the submarine cable system 1. The second reference level REF2 may be the optical level of the relay section n immediately after occurrence of the fault A. The first and second reference levels may be determined from the optical level calculated after a transient change in the optical level associated with operation start or occurrence of a fault converges. Such a convergence of a change generally takes about a few minutes of time. For the reference levels, a mean value or a median value of the optical levels calculated a plurality of times may be used. The first threshold value TH1 and the second threshold value TH2 may be the same as each other, or may be different from each other. For example, by setting TH1>TH2, detection sensitivity for second and subsequent faults in the relay section n can be increased.

The supervisory apparatus 100 can continue monitoring all of the relay sections, by repeatedly transmitting a supervisory signal even after detection of a fault and resetting of a reference level and a threshold value. Further, the supervisory apparatus 100 can know that a fault has occurred previously in the relay section n and that the reference level has changed from REF1 to REF2, by resetting the reference level according to occurrence of a fault and recording a content of the fault and a content of resetting. Then, the supervisory apparatus 100 can detect that a new fault B has occurred when the optical level of the relay section n exceeds a range defined by REF2 and TH2 after occurrence of the fault A.

Figure 4:
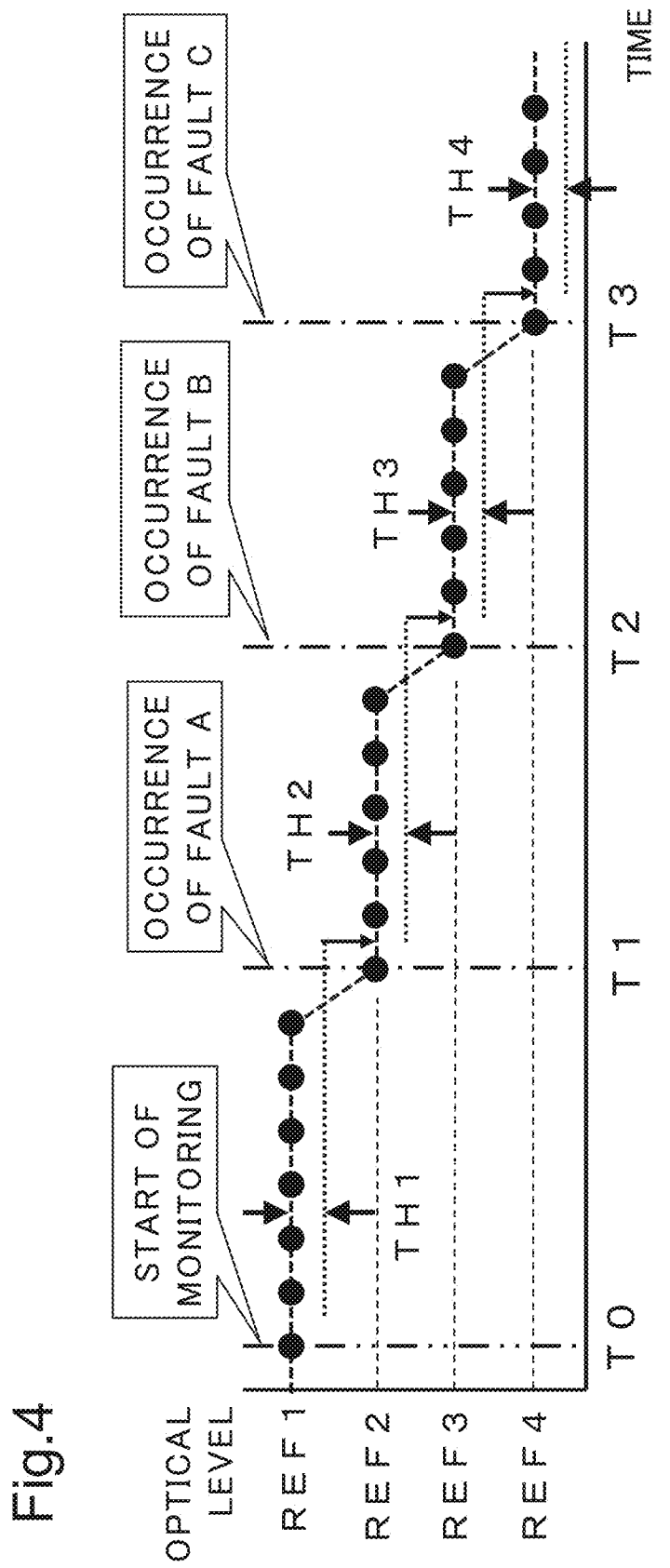
FIG. 4 is a diagram illustrating setting of a reference level and a threshold value associated therewith when a plurality of times of faults occur.

FIG. 4 is a diagram illustrating an example of a temporal change in the optical level of the relay section n. With use of FIG. 4, setting of second to fourth reference levels REF2 to REF4 and threshold values TH2 to TH4 associated therewith when a plurality of times of faults occur in the relay section n will be described.

The control unit 103 determines that the fault A has occurred in the relay section n when the optical level becomes equal to or less than the optical level defined by the first reference level REF1 and the first threshold value TH1 at the time T1. The control unit 103 sets and records the second reference level REF2 according to the optical level after occurrence of the fault A and the second threshold value TH2. The same applies to when the fault B and a fault C occur thereafter at a time T2 and a time T3, respectively. In other words, upon occurrence of the fault B, the control unit 103 sets and records a third reference level REF3 according to the optical level after occurrence of the fault B and a third threshold value TH3. Upon occurrence of the fault C after occurrence of the fault B, the control unit 103 sets and records a fourth reference level REF4 according to the optical level after occurrence of the fault C and a fourth threshold value TH4 associated therewith. Thereafter, the control unit 103 sets and records a reference level and a threshold value in a similar way on each occasion that a fault occurs. Thereby, the supervisory apparatus 100 can record a past fault, and can prepare for detection of a fault that may occur later.

Figure 5:
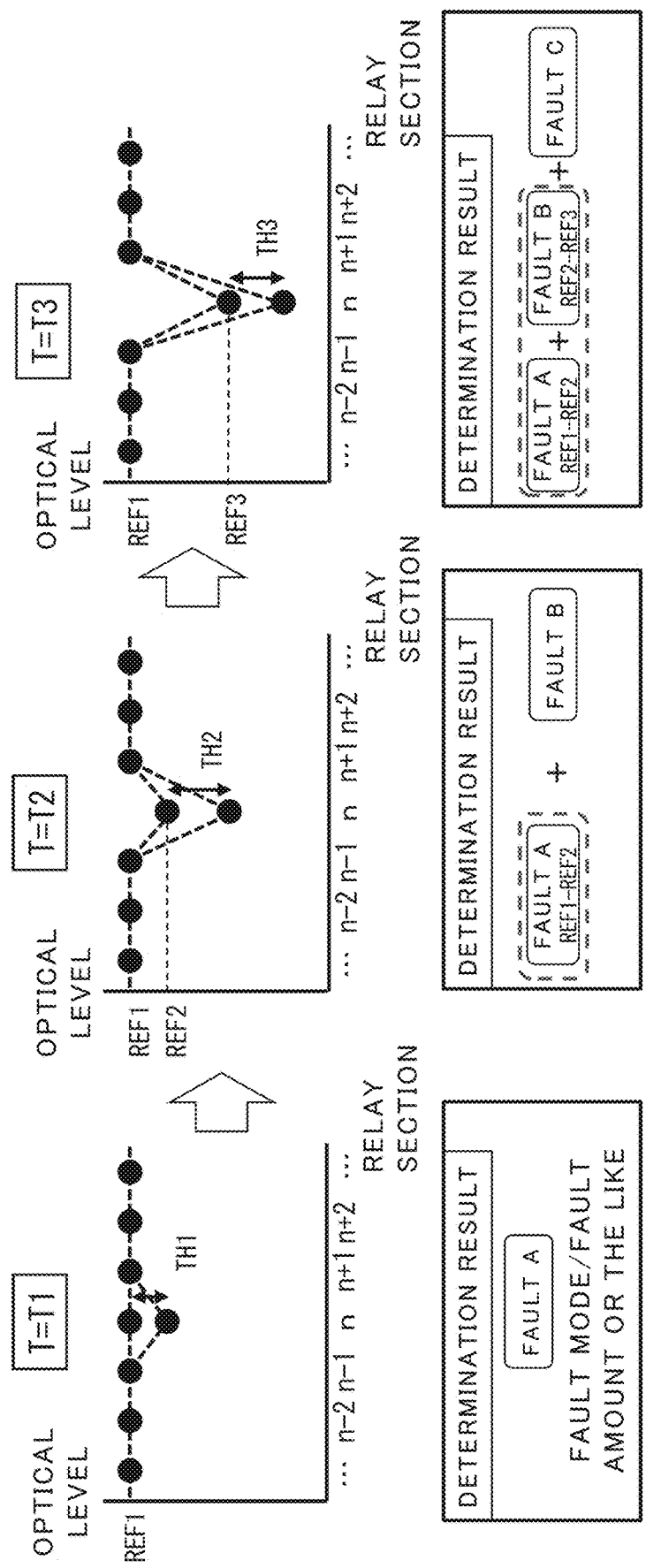
FIG. 5 is a diagram illustrating detection of a fault.

FIG. 5 is a diagram illustrating detection of a fault in the relay section n. FIG. 6 is a flowchart illustrating an example of a procedure of detecting a fault. With reference to FIGS. 4 to 6, detection and recording of a fault in the relay section n will be described. At an initial time T0, the first reference level REF1 and the first threshold value TH1 are set (Step S01 in FIG. 6). Thereafter, the control unit 103 repeats measurement of an optical level L (Steps S02 and S03). The transmitter 101 may transmit a next supervisory signal to the submarine cable 300 after optical feedbacks on a certain supervisory signal from all of the repeaters are received by the receiver 102.

Steps S03 to S06 in FIG. 6 are relevant to a state of T=T1 in FIGS. 4 and 5. When the optical level of a certain relay section decreases from the first reference level REF1 by the first threshold value TH1 or more at the time T1 (S03 in FIG. 6: YES), the control unit 103 determines that the fault A has occurred, and records the occurrence of the fault A as a determination result (Step S04). The determination result may include a fault mode and a fault amount of the fault A. The fault mode is, for example, a state of a fault (decreased optical level or the like), and the fault amount is, for example, a degree of a fault. Then, the control unit 103 sets the second reference level REF2 and the second threshold value TH2 (Step S05). The fault amount may include REF1, TH1, and an amount of decrease in the optical level at a time of detecting the fault A. The second reference level REF2 and the second threshold value TH2 may be set according to the optical level at a time of occurrence of the fault A. When the optical level after occurrence of the fault A is set as REF2, the amount of decrease in the optical level due to the fault A is REF1-REF2. Thereafter, the control unit 103 repeats measurement of the optical level L (Steps S06 and S07).

Steps S07 to S10 in FIG. 6 are relevant to a state of T=T2 in FIGS. 4 and 5. When the optical level of a certain relay section decreases from the second reference level REF2 by the second threshold value TH2 or more at the time T2 (Step S07: YES), the control unit 103 determines that the fault B has occurred, and records the occurrence of the fault B as a determination result (Step S08). Thereby, information on the past fault A and the new fault B is recorded as a determination result, together with the fault mode and the fault amount thereof. Further, the control unit 103 sets the third reference level REF3 and the third threshold value TH3 (Step S09). The fault amount of the fault B may include REF2, TH2, and an amount of decrease in the optical level at a time of detecting the fault B. The third reference level REF3 and the third threshold value TH3 may be set according to the optical level at a time of occurrence of the fault B. When the optical level after occurrence of the fault B is set as REF3, the amount of decrease in the optical level due to the fault B is REF2-REF3. Thereafter, the control unit 103 repeats measurement of the optical level L (Steps S10 and S11).

Steps S11 to S14 in FIG. 6 are relevant to a state of T=T3 in FIGS. 4 and 5. When the optical level of a certain relay section decreases from the third reference level REF3 by the third threshold value TH3 or more at the time T3 (Step S11: YES), the control unit 103 determines that the fault C has occurred, and records the occurrence of the fault C as a determination result (Step S12). Thereby, in addition to the information on the past fault A and the fault B, information on the new fault C is recorded as a determination result, together with the fault mode and the fault amount thereof. Then, the fourth reference level REF4 and the fourth threshold value TH4 are set (Step S13). The fourth reference level REF4 and the fourth threshold value TH4 may be set according to the optical level at a time of occurrence of the fault C. Thereafter, the control unit 103 repeats measurement of the optical level L (Step S14). The control unit 103 can continue detecting a fault in a similar way afterwards. The supervisory apparatus 100 including the functions described above can be called a fault detection apparatus.

Modification Example of First Example Embodiment

The advantageous effect of the first example embodiment is also exhibited by a modification example as follows.

(1) The control unit 103 may set, for a particular relay section, a fault detection reference different from another relay section. For example, when a loss in a relay section changes due to alteration in an environmental condition of the submarine cable 300 and the repeater 200, a reference level and a threshold value of the relay section may be corrected after construction in order to prevent a condition for detecting a fault from changing. Alternatively, the relay section may not be monitored.

(2) The control unit 103 may determine occurrence of a fault, based on a mean value, a median value, or the like of a plurality of times of measurement results of the optical level.

(3) The control unit 103 may determine that a fault has occurred in the relay section n when the optical level of the relay section n increases from an initial value by a predetermined threshold value or more.

(4) Determination of a fault may be performed based on a change in the optical level of a plurality of relay sections. For example, the control unit 103 may determine that a fault has occurred in the relay section n when a fault is detected in all of the consecutive relay section n−1, the relay section n, and the relay section n+1 and the optical level of the relay section n decreases most largely among the relay sections.

Alternatively, in such a case, the control unit 103 may determine that a fault has occurred in all of the relay sections, and may determine that a fault in the relay section n is most important and record a determination result including the determination.

(5) The control unit 103 may reset a reference level and a threshold value of only a relay section where a fault has been detected. Alternatively, the control unit 103 may reset a reference level and a threshold value of a relay section other than a relay section where a fault has been detected, with detection of the fault as a trigger.

(6) The control unit 103 may record each of patterns of a positional change and a temporal change in the optical level illustrated in [1] to [6] in FIG. 3, in association with a fault. Then, when a pattern similar to the recorded pattern occurs in a submarine cable system in operation, the control unit 103 may estimate that a fault similar to a past fault having the pattern has occurred.

As described above, the submarine cable system 1 and the supervisory apparatus 100 according to the first example embodiment enable detecting each of a plurality of faults occurring in a section through which an optical signal is transferred. The reason is that a reception level and a threshold value to be a reference for detecting a subsequently occurring fault are newly set after occurrence of a fault.

Second Example Embodiment

Figure 7:
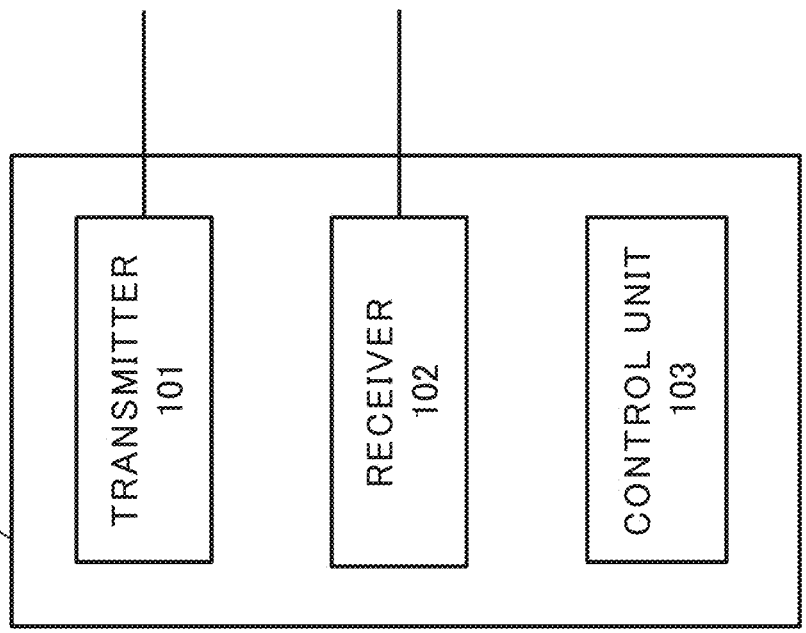
FIG. 7 is a diagram illustrating a configuration example of a supervisory apparatus 500 according to a second example embodiment.

FIG. 7 is a diagram illustrating a configuration example of a supervisory apparatus 500 according to a second example embodiment of the present invention. The supervisory apparatus 500 has a function and a configuration similar to the supervisory apparatus 100 according to the first example embodiment. In other words, the supervisory apparatus 500 includes a transmitter 101, a receiver 102, and a control unit 103. The transmitter 101 serves as a transmission means for transmitting a supervisory signal. The receiver 102 serves as a reception means for receiving an optical signal. The control unit 103 serves as a control means for performing internal control and setting of the supervisory apparatus 500. An optical signal that the transmitter 101 transmits can be called a first optical signal. An optical signal that the receiver 102 receives can be called a second optical signal.

FIG. 8 is a flowchart illustrating an operation example of the supervisory apparatus 500. The transmitter 101 transmits the first optical signal to an optical transmission path (Step S51 in FIG. 8). The receiver 102 receives the second optical signal from the optical transmission path in response to transmission of the first optical signal. The control unit 103 measures a reception level of the received second optical signal (Step S52). Further, the control unit 103 specifies a section where the second optical signal according to the first optical signal has been generated (Step S53). The control unit 103 may specify a section where the second optical signal has been generated, based on a transmission time of the first optical signal and a reception time of the second optical signal. The control unit 103 calculates, based on the reception level, an optical level L associated with a loss in the specified section (Step S54), and records the measured reception level and the specified section in association with a first time that is the reception time of the second optical signal.

When the optical level has changed from a first reference level REF1 by a first threshold value TH1 or more at the first time T1 (Step S55: YES), the control unit 103 determines that a fault A has occurred in the section (Step S56), and records the fault A. After recording the fault A, the control unit 103 sets a second reference level and a second threshold value (Step S57).

A procedure in Steps S58 to S60 is similar to Steps S52 to S54. The control unit 103 measures a reception level of the second optical signal (Step S58), and specifies a section where the second optical signal has been generated (Step S59). The control unit 103 calculates, based on the reception level, an optical level L associated with a loss in the specified section (Step S60), and records the measured reception level and the specified section in association with a first time that is the reception time of the second optical signal.

When the optical level has changed from the second reference level by the second threshold value or more (Step S61: YES), the control unit 103 determines that a fault B has occurred in the section. Thereafter, resetting of a reference level and a threshold value and detection of a fault may be performed in a way similar to Step S57.

The supervisory apparatus 500 including such a function can be called a fault detection apparatus. The supervisory apparatus 500 can detect each of a plurality of faults occurring in a section through which an optical signal is transferred, as different faults (the fault A and the fault B). The reason is that a reception level and a threshold value to be a reference for detecting the subsequently occurring fault B are newly set after occurrence of the fault A.

The example embodiments of the present invention can be described as, but not limited to, the following supplementary notes.

(Supplementary Note 1)

A fault detection apparatus including:

a transmission means for transmitting a first optical signal to an optical transmission path;

a reception means for receiving a second optical signal from the optical transmission path in response to transmission of the first optical signal, and measuring a reception level of the second optical signal; and a control means for specifying a section where the second optical signal according to the first optical signal has been generated, calculating, based on the reception level, an optical level associated with a loss in the section, determining that a first fault has occurred in the section when the optical level of the section has changed from a first reference level by a first threshold value or more, setting a second reference level and a second threshold value after occurrence of the first fault, and determining that a second fault has occurred in the section when the optical level has changed from the second reference level by the second threshold value or more.

(Supplementary Note 2)

The fault detection apparatus according to supplementary note 1, wherein the transmission means repeatedly transmits an optical pulse as the first optical signal, and the reception means measures the reception level in association with each of the optical pulses.

(Supplementary Note 3)

The fault detection apparatus according to supplementary note 1 or 2, wherein the optical transmission path is a submarine cable through which a plurality of optical repeaters are connected in cascade, the second optical signal is the first optical signal looped-back in each of the plurality of optical repeaters, and the control means specifies the section, based on a transmission time of the first optical signal, a reception time of the second optical signal, and a distance to each of the plurality of repeaters.

(Supplementary Note 4)

The fault detection apparatus according to supplementary note 3, wherein the section includes one of the plurality of optical repeaters in which the second optical signal is generated as a looped-back signal of the first optical signal.

(Supplementary Note 5)

The fault detection apparatus according to any one of supplementary notes 1 to 4, wherein the control means sets the second reference level and the second threshold value according to the optical level at a time of occurrence of the first fault.

(Supplementary Note 6)

The fault detection apparatus according to any one of supplementary notes 1 to 5, wherein the control means determines at least one of occurrence of the first fault and occurrence of the second fault, based on a change in the optical level of a plurality of the sections.

(Supplementary Note 7)

The fault detection apparatus according to any one of supplementary notes 1 to 6, wherein the control means sets a reference level and a threshold value of a section other than the section where a fault has been detected, with occurrence of at least one of the first fault and the second fault as a trigger.

(Supplementary Note 8)

The fault detection apparatus according to any one of supplementary notes 1 to 7, wherein the control means records a change in the optical level in association with a fault, and determines occurrence of a fault, based on the recorded change in the optical level.

(Supplementary Note 9)

A submarine cable system including:

an optical transmission path; and the fault detection apparatus according to any one of supplementary notes 1 to 8, wherein the fault detection apparatus transmits the first optical signal to the optical transmission path, and receives the second optical signal from the optical transmission path.

(Supplementary Note 10)

A fault detection method including:

transmitting a first optical signal to an optical transmission path;

receiving a second optical signal from the optical transmission path in response to transmission of the first optical signal;

measuring a reception level of the second optical signal;

specifying a section where the second optical signal according to the first optical signal has been generated;

calculating, based on the reception level, an optical level associated with a loss in the section;

determining that a first fault has occurred in the section when the optical level of the section has changed from a first reference level by a first threshold value or more;

setting a second reference level and a second threshold value after occurrence of the first fault; and determining that a second fault has occurred in the section when the optical level has changed from the second reference level by the second threshold value or more.

(Supplementary Note 11)

The fault detection method according to supplementary note 10, further including:

repeatedly transmitting an optical pulse as the first optical signal; and measuring the reception level in association with each of the optical pulses.

(Supplementary Note 12)

The fault detection method according to supplementary note 10 or 11, wherein the optical transmission path is a submarine cable through which a plurality of optical repeaters are connected in cascade, and the second optical signal is the first optical signal looped-back in each of the plurality of optical repeaters, the fault detection method further including specifying the section, based on a transmission time of the first optical signal, a reception time of the second optical signal, and a distance to each of the plurality of repeaters.

(Supplementary Note 13)

The fault detection method according to supplementary note 12, wherein the section includes one of the plurality of optical repeaters in which the second optical signal is generated as a looped-back signal of the first optical signal.

(Supplementary Note 14)

The fault detection method according to any one of supplementary notes 10 to 13, further including setting the second reference level and the second threshold value according to the optical level at a time of occurrence of the first fault.

(Supplementary Note 15)

The fault detection method according to any one of supplementary notes 10 to 14, further including determining at least one of occurrence of the first fault and occurrence of the second fault, based on a change in the optical level of a plurality of the sections.

(Supplementary Note 16)

The fault detection method according to any one of supplementary notes 10 to 15, further including setting a reference level and a threshold value of a section other than the section where a fault has been detected, with occurrence of at least one of the first fault and the second fault as a trigger.

(Supplementary Note 17)

The fault detection method according to any one of supplementary notes 10 to 16, further including recording a change in the optical level in association with a fault, and determining occurrence of a fault, based on the recorded change in the optical level.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims. For example, each of the example embodiments can be applied not only to a submarine cable system, but also to a terrestrial optical transmission system.

Further, the configurations described in the example embodiments may not necessarily be mutually exclusive. The function and the effect of the present invention may be achieved by a configuration combining some or all of the above-described example embodiments.

The functions and the procedures described in each of the example embodiments may be achieved by executing a program by a central processing unit (CPU) included in a positioning apparatus thereof. The program is recorded on a fixed and non-transitory (tangible and non-transitory) recording medium. As the recording medium, a semiconductor memory or a fixed magnetic disk apparatus is used, but is not limited thereto. The CPU is, for example, a computer included in the control unit 103, but the CPU may be included in another place within the supervisory apparatus 100.

This application is based upon and claims the benefit of priority from Japanese patent application No. 2020-025893, filed on Feb. 19, 2020, the disclosure of which is incorporated herein in its entirety by reference.

REFERENCE SIGNS LIST

1 Submarine cable system
200, 201 to 20m Repeater
100 Supervisory apparatus
101 Transmitter
102 Receiver
103 Control unit
111, 112 Transmission path interface
121, 122 Optical transmission apparatus
211, 212 Optical amplifier
220 Loopback circuit
221, 222 Optical coupler
223 Optical filter
300 Submarine cable
500 Supervisory apparatus

What is claimed is:

1. A fault detection apparatus comprising:
a transmitter configured to transmit a first optical signal to an optical transmission path;
a receiver configured to receive a second optical signal from the optical transmission path in response to transmission of the first optical signal, and measuring a reception level of the second optical signal; and
a controller configured to specify a section where the second optical signal according to the first optical signal has been generated, calculating, based on the reception level, an optical level associated with a loss in the section, determining that a first fault has occurred in the section when the optical level of the section has changed from a first reference level by a first threshold value or more, setting a second reference level and a second threshold value after occurrence of the first fault, and determining that a second fault has occurred in the section when the optical level has changed from the second reference level by the second threshold value or more; wherein the optical transmission path is a submarine cable through which a plurality of optical repeaters are connected in cascade, the second optical signal is the first optical signal looped-back in each of the plurality of optical repeaters, and the controller specifies the section, based on a transmission time of the first optical signal, a reception time of the second optical signal, and a distance to each of the plurality of repeaters.

2. The fault detection apparatus according to claim 1, wherein
the transmitter repeatedly transmits an optical pulse as the first optical signal, and
the receiver measures the reception level in association with each of the optical pulses.

3. The fault detection apparatus according to claim 2, wherein
the controller sets the second reference level and the second threshold value according to the optical level at a time of occurrence of the first fault.

4. The fault detection apparatus according to claim 2, wherein
the controller determines at least one of occurrence of the first fault and occurrence of the second fault, based on a change in the optical level of a plurality of the sections.

5. The fault detection apparatus according to claim 2, wherein the controller sets a reference level and a threshold value of a section other than the section where a fault has been detected, with occurrence of at least one of the first fault and the second fault as a trigger.

6. The fault detection apparatus according to claim 2, wherein
the controller records a change in the optical level in association with a fault, and determines occurrence of a fault, based on the recorded change in the optical level.

7. A submarine cable system comprising:
an optical transmission path; and
the fault detection apparatus according to claim 2, wherein
the fault detection apparatus transmits the first optical signal to the optical transmission path, and receives the second optical signal from the optical transmission path.

8. The fault detection apparatus according to claim 1, wherein
the section includes one of the plurality of optical repeaters in which the second optical signal is generated as a looped-back signal of the first optical signal.

9. The fault detection apparatus according to claim 1, wherein
the controller sets the second reference level and the second threshold value according to the optical level at a time of occurrence of the first fault.

10. The fault detection apparatus according to claim 1, wherein
the controller determines at least one of occurrence of the first fault and occurrence of the second fault, based on a change in the optical level of a plurality of the sections.

11. The fault detection apparatus according to claim 1, wherein
the controller sets a reference level and a threshold value of a section other than the section where a fault has been detected, with occurrence of at least one of the first fault and the second fault as a trigger.

12. The fault detection apparatus according to claim 1, wherein
the control means controller records a change in the optical level in association with a fault, and determines occurrence of a fault, based on the recorded change in the optical level.

13. A submarine cable system comprising:
an optical transmission path; and
the fault detection apparatus according to claim 1, wherein
the fault detection apparatus transmits the first optical signal to the optical transmission path, and receives the second optical signal from the optical transmission path.

14. A fault detection method comprising:
transmitting a first optical signal to an optical transmission path;
receiving a second optical signal from the optical transmission path in response to transmission of the first optical signal;
measuring a reception level of the second optical signal;
specifying a section where the second optical signal according to the first optical signal has been generated;
calculating, based on the reception level, an optical level associated with a loss in the section;
determining that a first fault has occurred in the section when the optical level of the section has changed from a first reference level by a first threshold value or more;
setting a second reference level and a second threshold value after occurrence of the first fault; and
determining that a second fault has occurred in the section when the optical level has changed from the second reference level by the second threshold value or more;
wherein the optical transmission path is a submarine cable through which a plurality of optical repeaters are connected in cascade, and the second optical signal is the first optical signal looped-back in each of the plurality of optical repeaters; said method further comprising specifying the section, based on a transmission time of the first optical signal, a reception time of the second optical signal, and a distance to each of the plurality of repeaters.

15. The fault detection method according to claim 14, further comprising:
repeatedly transmitting an optical pulse as the first optical signal; and
measuring the reception level in association with each of the optical pulses.

16. The fault detection method according to claim 14, wherein
the section includes one of the plurality of optical repeaters in which the second optical signal is generated as a looped-back signal of the first optical signal.

17. The fault detection method according to claim 14, further comprising
setting the second reference level and the second threshold value according to the optical level at a time of occurrence of the first fault.

* * * * *